United States Patent [19]

Schäfer et al.

[11] Patent Number: 5,419,581
[45] Date of Patent: May 30, 1995

[54] ADJUSTABLE STEERING COLUMN FOR MOTOR VEHICLES

[75] Inventors: Burkhard Schäfer, Lemförde; Kai-Uwe Grams, Cappeln; Jens Vortmeyer, Pr.-Oldendorf; Georg Hagemann, Diepholz, Eduard Jaegermeyr, Moosburg; Franz Aromberger, Petershausen; Walter Egartner, Munich; all of Germany

[73] Assignee: Lemförder Metallwaren AG, Lemförde, Germany

[21] Appl. No.: 146,955

[22] Filed: Nov. 3, 1993

[30] Foreign Application Priority Data

Nov. 17, 1992 [DE] Germany .................. 42 38 732.9

[51] Int. Cl.[6] .................... B62D 1/18; F15B 15/14
[52] U.S. Cl. ................................. 280/775; 74/493
[58] Field of Search ............... 280/775, 777; 74/493

[56] References Cited

U.S. PATENT DOCUMENTS 4,209,074 6/1980 York ................................. 280/775
4,476,741 10/1984 Yamaguchi ...................... 280/775
5,088,767 2/1992 Hoblingre et al. .............. 280/775
5,113,716 5/1992 Dumschat et al. .............. 280/775

FOREIGN PATENT DOCUMENTS

3536285C1 4/1987 Germany .

Primary Examiner—Kenneth R. Rice
Attorney, Agent, or Firm—McGlew and Tuttle

[57] ABSTRACT

An adjustable steering column for motor vehicles, in which a steering axle (2), which is composed of parts that are telescopingly displaceable in relation to one another and is connected at its top end (3) to the steering wheel, is rotatably mounted in a housing (1), and this housing is supported in a holder (4) that is a rigid part of the body both pivotably around a transverse axis (7) and displaceably in the longitudinal direction of the steering column in relation to the body. The actually supported position is continuously lockable by two hydraulically acting piston-and-cylinder units (13, 14), which are rigidly articulated to the body, on the one hand, and are connected to the housing (1) in an articulated manner, on the other hand. One of the two piston-and-cylinder units (13) is connected to the housing (1) in an articulated manner via an angle lever (10) that is mounted in the holder (4) pivotably around a transverse axis (7), and both piston-and-cylinder units (13, 14) are aligned approximately in parallel to the longitudinal axis (8) of the steering column.

11 Claims, 1 Drawing Sheet

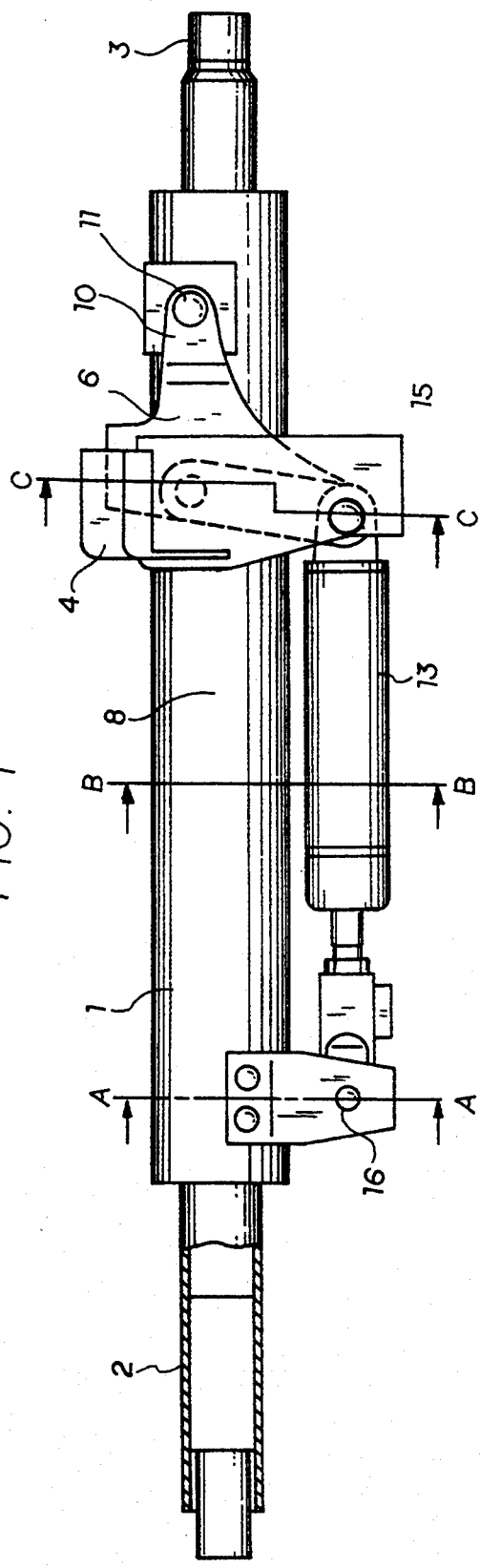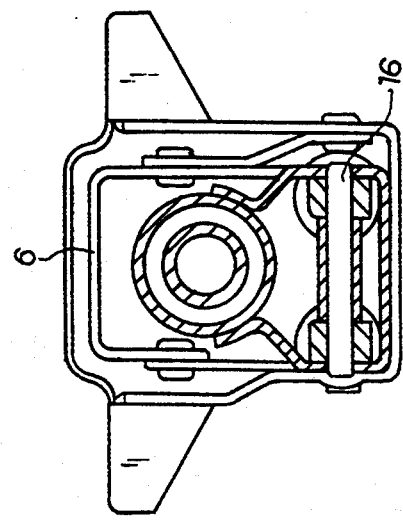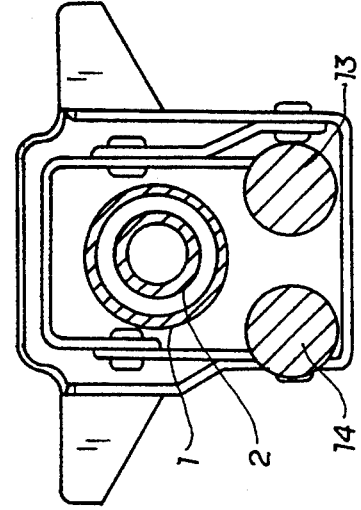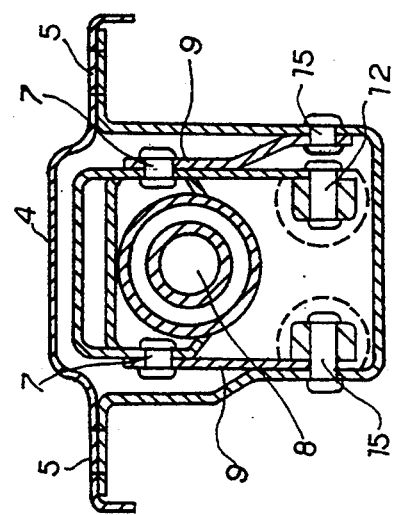

though only one is shown in FIG. 2. Here it is essential that this pin connection is accommodated in the box profile-like design, so that greater strength is again achieved at this point, i.e., the strap 6 is designed as an angle lever, as is shown in FIG. 1.

ADJUSTABLE STEERING COLUMN FOR MOTOR VEHICLES

FIELD OF THE INVENTION

The present invention pertains to an adjustable steering column for motor vehicles in which a steering axle, which is composed of parts that are telescopingly displaceable in relation to one another and which is connected at a top end to the steering wheel, is mounted rotatably in a housing, the housing is supported in a holder that is a rigid part of the body for both pivoting around a transverse axis and for displacement in a longitudinal direction of the steering column whereby the position can be continuously regulated by two hydraulically acting piston-and-cylinder units, which cylinder units are rigidly attached to the body and are connected to the housing in an articulated manner.

BACKGROUND OF THE INVENTION

Similar characteristics have been known from DE 35 36 285 C1. Such an arrangement makes it possible to continuously adjust the length and the height of the steering wheel mounted at the top end of a steering column, as well as to lock the set position of the steering wheel by hydraulically blocking the pistons in the cylinders of the piston-and-cylinder units. In the variant represented in FIG. 3 of this document, hydraulically acting piston-and-cylinder units are arranged offset at an angle of ca. 90° in relation to one another. These units are linked with one of their ends together to the adjustable housing, in which the steering axle is rotatably mounted. One piston-and-cylinder unit is connected, with the respective other end, to a component that is a fixed part of the body in an articulated manner. The other piston-and-cylinder unit is connected to a lower housing, which is fixed against displacement in the longitudinal direction. The prior-art arrangement requires much construction space for its accommodation, as well as separate operating members for the two piston-and-cylinder units.

SUMMARY AND OBJECTS OF THE INVENTION

The object of the present invention is to improve the features from prior art designs to reduce the construction space needed for the accommodation and to operate the two piston-and-cylinder units by a single operating member.

According to the invention, an adjustable steering column for motor vehicles is provided wherein the steering axle is formed of parts that are telescopingly displaceable in relation to one another. The steering axle is connected at a top end of the steering wheel and is mounted rotatably in a housing. The housing is supported in a holder that is a rigid part of the vehicle body for pivotable movement around a transverse axis and for displacement in a longitudinal direction of the steering column in relation to the body. Two piston-and-cylinder units are connected to the housing in an articulated manner via an angle lever mounted in the holder around a transverse axis. Both piston-and-cylinder units are aligned approximately in parallel to the longitudinal axis of the steering column.

The holder which is rigidly attached to the body is formed of sheet-metal structural parts. The holder extends with a U-shaped design over the housing from the top. The angle lever is also designed, in cross section, to a longitudinal axis, as a U-shape strap which is pivotable around a transverse axis in the holder. The piston-and-cylinder units have a gas pressure pretension and have valves in their pistons which can be operated via channels in the piston rod which is led out of the cylinder in one side.

It is an essential advantage of these design characteristics that the two piston-and-cylinder units used for the hydraulic blocking of the steering wheel position set can be accommodated in a very small space under the steering column in parallel position to one another, so that means for blocking and unlocking the two piston-and-cylinder units can be operated by a single operating member. A holder made of sheet-metal structural parts is preferred, so that a U-shaped holder design extends over the housing from the top, and an angle lever consisting of sheet metal is also designed as a U-shaped sheet-metal strap in the cross section through the longitudinal axis of the steering column, and is mounted in the holder pivotably around a transverse axis. This makes possible the reliable transmission of strong forces, which occur and must be transmitted, e.g., in the case of the impact of a vehicle in order to guarantee, e.g., the action of an air bag.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

BRIEF DESCRIPTION OF THE DRAWINGS In the drawings:

FIG. 1 is a side view of the top end of a steering column for motor vehicles;

FIG. 2 is a cross sectional view along line A—A in FIG. 1;

FIG. 3 is a cross sectional view along line B—B in FIG. 1; and

FIG. 4 is a cross sectional view along line C—C in FIG. 1.

DETAILED DESCRIPTION OF THE PREFERRED EMBODIMENT

Referring to the drawings in particular, an exemplary embodiment is shown with a top end 3 of a steering axle 2, which is composed of parts that are displaceable in relation to one another. The top end of the steering axle 2 is mounted in a housing 1, and the lower end (to the left in FIG. 1) of the steering axle 2 is connected via a cardan joint or the like to the steering gear. The steering wheel is attached to the top end 3 of the steering axle 2. The top end 3 of the steering axle 2 is mounted rotatably, but axially nondisplaceably in the housing 1. The housing 1 is in turn supported in a holder 4, which is rigidly arranged on the body, is formed from sheet-metal structural parts, and is connected to the body by bolts, which pass through tile openings 5 shown in FIGS. 2 through 4. The holder 4 extends with a U-shaped design over the housing 1 from the top. To achieve greater strength, the holder 4 in the exemplary embodiment has a box profile-like design in the cross section as shown in to FIG. 4. Another U-shaped strap 6 is mounted pivotably at right angles to the longitudinal axis 8 of the steering column by means of pins 7 within the holder 4. For design reasons, the pins 7 are supported within the holder 4 in the top ends of braces 9, which in turn are permanently connected to the holder 4. The U-shaped strap 6 is designed, in its side view, as an angle lever 10 on both sides, it is connected by means of pins 11 to the housing in an articulated and axially limitedly movable manner, and its other arm is connected on one side to one end of a piston-and-cylinder unit 13 in an articulated manner around a pin 12. A second piston-and-cylinder unit 14, one end of which is connected to the holder 4 in an articulated manner around a pin 15, is provided in parallel to the piston-and-cylinder unit 13 and in parallel to the longitudinal axis 8 of the steering column. The other ends of both the piston-and-cylinder units 13 and 14 are connected to the housing 1 in an articulated manner around a pin 16. The described arrangement makes possible a pivoting movement of the top steering axle ends 3 around the axis of the pins 7 during a corresponding change in the length of the unlocked piston-and-cylinder unit 13, and, in addition, a longitudinal displacement of the housing 1 around the axis of the pins 15 when the piston-and-cylinder unit 14 is unlocked. If both the piston-and-cylinder units 13 and 14 are unlocked, the steering wheel can be adjusted continuously by pivoting and pushing movements, so that the position set can be locked by locking the two piston-and-cylinder units 13 and 14. The unlocking and blocking of the two piston-and-cylinder units 13 and 14 can be performed by a single operating member. The use of commercially available hydraulic blocking units, in which a pretension is provided by a gas pressure blanket, is preferable. Such blocking units consist of a liquid-filled cylinder and a piston arranged therein, whose piston rod can be led out of the cylinder on one side, as well as of another piston, which limits the liquid-filled cylinder space and is supported on the opposite side against a pretensioned gas pressure blanket. A valve, whose operating means can be operated via channels in the piston rod, so that the valves in the two piston-and-cylinder units 13 and 14 can be closed or opened by a common operating member for blocking and unlocking the piston-and-cylinder unit. Piston-and-cylinder units with such design characteristics are known and are not consequently the subject of the present invention.

While a specific embodiment of the invention has been shown and described in detail to illustrate the application of the principles of the invention, it will be understood that the invention may be embodied otherwise without departing from such principles.

What is claimed is:

1. Adjustable steering column for motor vehicles, comprising:
   a steering axle formed of parts which are telescopingly displaceable in relation to one another, said steering axle being connected at a top end to a steering wheel;
   a housing, said steering axle being mounted rotatably in said housing;
   a holder forming a rigid part of the vehicle body;
   two hydraulically acting piston-and-cylinder units rigidly articulated to the body and connected to said housing in an articulated manner, one of said piston-and-cylinder units for displacing said housing in a longitudinal direction in relation to said body, each of said piston-and-cylinder units being aligned approximately in parallel to a longitudinal axis of the steering column;
   angle lever means mounted in said holder around a transverse axis, said angle lever means for connecting another of said piston-and-cylinder units to said housing for pivoting said housing around a transverse axis.

2. Steering column according to claim 1, wherein:
   said holder is formed of sheet-metal structural parts, said holder structural parts extending in a u-shape design over said housing from a top of said housing, said angle lever means being designed in cross section to said longitudinal axis of the steering column, as a u-shape strap pivotable around a transverse axis in said holder.

3. Steering column according to claim 1, wherein:
   said piston-and-cylinder units have a gas pressure pre-tension.

4. Steering column according to claim 2, wherein:
   said piston-and-cylinder units have a gas pressure pre-tension.

5. Steering column according to claim 1, wherein:
   said piston-and-cylinder units have valves in their pistons, said valves being operated by channels in each piston rod, said channels being led out of each cylinder on one side.

6. Steering column according to claim 2, wherein:
   said piston-and-cylinder units have valves in their pistons, said valves being operated by channels in each piston rod, said channels being led out of each cylinder on one side.

7. Steering column according to claim 3, wherein:
   said piston-and-cylinder units have valves in their pistons, said valves being operated by channels in each piston rod, said channels being led out of each cylinder on one side.

8. Adjustable steering column for motor vehicles, comprising:
   a steering axle formed of parts which are telescopingly displaceable in relation to one another, said steering axle being connected at a top end to a steering wheel;
   a housing, said steering axle top end being mounted rotatably and axially nondisplacebly in said housing;
   a holder forming a rigid part of the vehicle body;
   a first hydraulically acting piston-and-cylinder unit with a first end articulated to said housing and with a second end connected to said body for displacing said housing in a longitudinal direction in relation to said body;
   a second hydraulically acting piston-and-cylinder unit with a first end articulated to said housing and a second end, each of said piston-and-cylinder units being aligned approximately in parallel to a longitudinal axis of the steering column;
   angle lever means mounted in said holder around an axis transverse to said longitudinal axis of the steering column, said angle lever means for connecting said second end of said second piston-and-cylinder unit to said housing for pivoting said housing around an axis transverse to said longitudinal axis of the steering column.

9. Steering column according to claim 8, wherein:
   said holder is formed of sheet-metal structural parts, said holder structural parts extending in a u-shape design over a portion of said housing from a top of said housing, said angle lever means including a strap having a u-shape in cross section.

10. An adjustable steering column for motor vehicles, comprising:
- a steering axle formed of parts which are telescopingly displaceable in relation to one another, said steering axle having a top end connected to said steering wheel;
- a housing, said steering axle top end being mounted rotatably and axially nondisplacebly in said housing;
- a holder forming a rigid part of the vehicle body;
- first hydraulically acting piston-and-cylinder means including a first end articulated to said housing and with a second end connected to said body, said first hydraulically acting piston-and-cylinder means for displacing said housing in a direction along a longitudinal axis of the steering column;
- a second hydraulically acting piston-and-cylinder means including a first end articulated to said housing and a second end, each of said piston-and-cylinder units being aligned approximately in parallel to a longitudinal axis of the steering column;
- angle lever means connected to said holder few movement around an axis transverse to said longitudinal axis of the steering column, said angle lever means for connecting said second piston-and-cylinder means to said housing, whereby said second hydraulically acting piston-and-cylinder means controls displacement of said housing around an axis transverse to said longitudinal axis of the steering column.

11. Steering column according to claim 10, wherein: said holder is formed of sheet-metal structural parts, said holder structural parts extending in a u-shape design over a portion of said housing from a top of said housing, said angle lever means including a strap having a u-shape in cross section.

* * * * *

UNITED STATES PATENT AND TRADEMARK OFFICE
CERTIFICATE OF CORRECTION

PATENT NO. : 5,419,581

DATED : May 30, 1995

INVENTOR(S) : SCHAFER et al.

It is certified that error appears in the above-indentified patent and that said Letters Patent is hereby corrected as shown below:

On the title page, item [75], change "Aromberger" to --Promberger--.

Signed and Sealed this

Twenty-fourth Day of October, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,419,581
DATED : May 30, 1995
INVENTOR(S) : SCHAFER et al.

It is certified that error appears in the above-indentified patent and that said Letters Patent is hereby corrected as shown below:

On the title page :   Item [73] Assignee: should read --

Bayerische Motoren Werke AG, München, Germany --.

Signed and Sealed this

Thirteenth Day of February, 1996

*Attest:*

BRUCE LEHMAN

*Attesting Officer*   Commissioner of Patents and Trademarks